United States Patent
Wang et al.

(10) Patent No.: US 8,198,841 B2
(45) Date of Patent: Jun. 12, 2012

(54) METHOD AND CIRCUIT FOR PROCESSING A RESOLVER FAULT

(75) Inventors: Wei D. Wang, Troy, MI (US); Bon Ho Bae, Torrance, CA (US); Stephen T. West, New Palestine, IN (US); Rick H. Schroeder, Lapeer, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 12/543,708

(22) Filed: Aug. 19, 2009

(65) Prior Publication Data

US 2011/0043145 A1    Feb. 24, 2011

(51) Int. Cl.
*H02P 6/16*    (2006.01)
(52) U.S. Cl. .............. 318/400.04; 318/400.01; 318/700; 318/661; 318/638; 318/652
(58) Field of Classification Search ............. 318/400.04, 318/400.01, 700, 661, 638, 652, 656
See application file for complete search history.

(56) References Cited

U.S. PATENT DOCUMENTS

| | | | |
|---|---|---|---|
| 5,691,611 A * | 11/1997 | Kojima et al. | 318/400.04 |
| 6,205,009 B1 * | 3/2001 | Clark et al. | 361/78 |
| 6,389,373 B1 * | 5/2002 | Ohya | 702/189 |
| 6,426,712 B1 * | 7/2002 | Hare et al. | 341/116 |
| 6,577,957 B2 * | 6/2003 | Fujimoto et al. | 702/36 |
| 6,803,781 B2 | 10/2004 | Kobayashi et al. | |
| 7,002,318 B1 | 2/2006 | Schulz et al. | |
| 7,336,456 B2 * | 2/2008 | Matsushita et al. | 361/31 |

* cited by examiner

*Primary Examiner* — Walter Benson
*Assistant Examiner* — David Luo
(74) *Attorney, Agent, or Firm* — Quinn Law Group, PLLC

(57) ABSTRACT

A method of processing a resolver fault in a motor generator unit (MGU) includes receiving a position signal from a resolver describing a measured angular position of a rotor of the MGU, determining the presence of the resolver fault using the position signal, and calculating or extrapolating an estimated rotor position when the resolver fault is determined. A predetermined resolver fault state may be determined using a measured duration of the resolver fault, and the MGU may be controlled using the estimated rotor position for at least a portion of the duration of the resolver fault. A motor control circuit is operable for processing the resolver fault using the above method, and may automatically vary a torque output or a pulse-width modulation (PWM) of the MGU depending on the duration of the resolver fault.

16 Claims, 4 Drawing Sheets

METHOD AND CIRCUIT FOR PROCESSING A RESOLVER FAULT

TECHNICAL FIELD

The present invention relates a method and a motor control circuit adapted for processing a motor/generator unit (MGU) resolver fault.

BACKGROUND OF THE INVENTION

In a high-voltage propelled vehicle such as a hybrid-electric vehicle (HEV) or an electric vehicle (EV), an onboard energy storage system (ESS) provides a source of at least a portion of the necessary propulsive power. An internal combustion engine may be shut off or selectively powered down when the vehicle is idling in order to conserve fuel. Energy may be captured during a regenerative braking event in order to recharge the ESS, and thereby further optimize fuel economy. The ESS may be configured as a bank of battery cells that collectively store a relatively high voltage, e.g., 300 volts or higher. This voltage is transmitted to one or more high-voltage devices, including one or more motor/generator units (MGU), via a high-voltage bus and a power inverter module (PIM).

To ensure optimal performance of the various electrical systems aboard the HEV or EV, an electronic control unit or controller may be used to perform various electrical measurements and/or onboard diagnostics. One such component is a resolver. This device may be configured as absolute angle transducer, and may be used to monitor the changing angular position and rotational speed of a rotor portion of the MGU. Motor torque may be controlled using the rotor position and other feedback signals. Certain conventional vehicle control systems may utilize simple switch-debouncing procedures of the type known in the art, which may in turn cause the vehicle to shut down during a resolver fault in an attempt at preventing undesirable generation of motor torque during the duration of the resolver fault.

SUMMARY OF THE INVENTION

Accordingly, a method is provided herein that allows a controller of an MGU, e.g., an MGU used for propelling an HEV or EV, a sufficient amount of time to "ride out" an intermittent resolver fault without necessarily shutting the vehicle down, thus providing a relatively smooth transition from a resolver fault state to a normal operating state. The method may be embodied in algorithmic form and automatically executed via the controller during a detected resolver fault. Motor position, required motor torque capacity, and fault recovery logic may be determined by the controller in a manner consistent with the detected fault.

Using the algorithm of the invention, the controller may detect the resolver fault, e.g., by checking discrete fault inputs or control output signals from a 12-bit resolver decoder chip or other decoder chip of the type known in the art. When the controller sees a particular resolver fault, such as one of four resolver fault states as set forth below in one particular embodiment, a rotor position signal transmitted by the resolver is temporarily disregarded, and a different estimated value is instead calculated or extrapolated from a last known valid position and motor speed. The last known valid speed may then be used as the present speed, and the resolver fault state may be automatically changed to a cautionary state.

According to one embodiment, the four resolver faults may include: a short-duration fault (SD Fault), a medium-duration fault (MD Fault), a long-duration fault (LD Fault), and a repeated medium-duration fault (RMD Fault). As used herein, the term "SD Fault" refers to a resolver fault that occurs when the duration of the resolver fault is shorter than a calibrated threshold, i.e., an initial coast period. During such an initial coast period, the PIM operates normally or without any degradation or change in performance. An MD Fault occurs when the duration of the resolver fault is longer than the initial coast period but shorter than a calibrated maximum allowable resolver retry period. The LD Fault occurs when the duration of the resolver fault is longer than the calibrated resolver retry period. The RMD Fault occurs when the duration of a series of resolver faults is greater than the initial coast period and shorter than the calibrated resolver retry period.

In particular, a method of processing a resolver fault for a motor generator unit (MGU), such as but not limited to those typically used for propelling an HEV or EV as described above, includes receiving a rotor position signal from a resolver describing a measured position of a rotor of the MGU, detecting the resolver fault, and calculating or extrapolating a position of the rotor when the resolver fault is detected. A predetermined resolver fault state may be selected or determined using the duration of the resolver fault. A controller controls an operation of the MGU, e.g., a torque output and/or pulse width modulation (PWM) process, using the estimated position, i.e., the calculated or extrapolated rotor position, over at least a portion of the resolver fault state.

A controller is also provided for a motor/generator unit (MGU) having a resolver adapted for monitoring the position of the rotor. The controller is adapted for detecting a resolver fault using a signal from the resolver, extrapolating a position of the rotor when the resolver fault is detected, selecting a resolver fault state based on a duration of the resolver fault, and controlling the output of the MGU using the extrapolated rotor position for at least a portion of the duration of the selected resolver fault state. Output of the MGU may be controlled by automatically varying a PWM operation thereof based on the duration of the resolver fault, or by at least temporarily reducing torque output of the MGU when the duration is greater than a first threshold duration and less than a second threshold duration. Torque output may be reduced to zero when the duration is greater than the second threshold duration.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
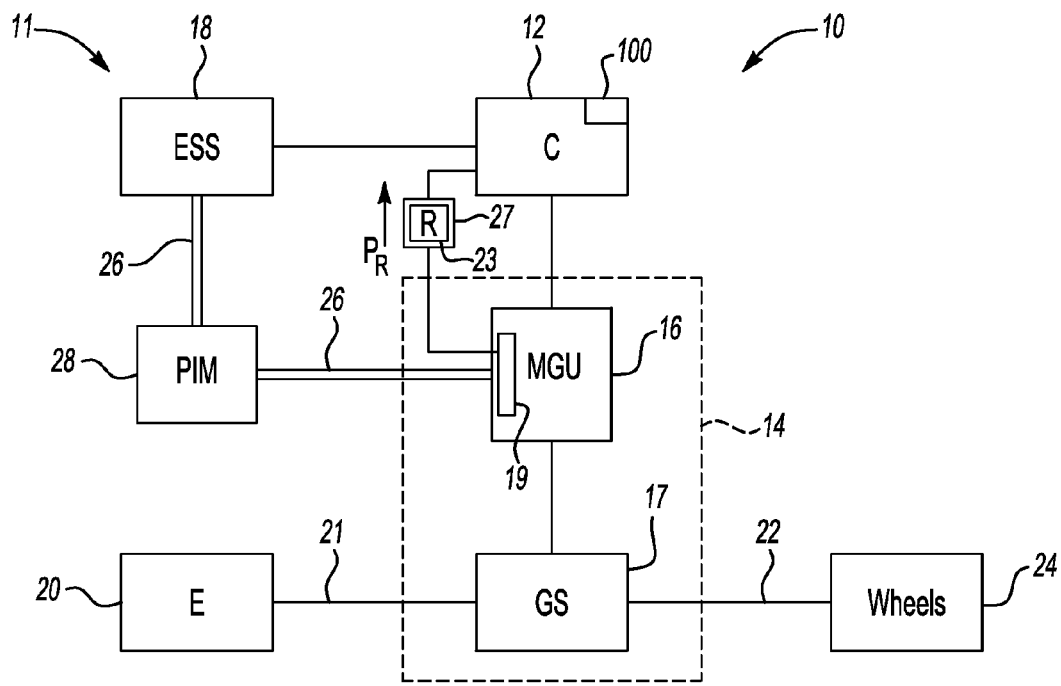
FIG. 1 is a schematic illustration of a vehicle having a resolver and a motor controller.

Referring to the drawings, wherein like reference numbers correspond to like or similar components throughout the several figures, FIG. 1 shows a vehicle 10 having a motor control circuit 11, although the circuit may be used separately from the vehicle without departing from the intended inventive scope. Circuit 11 includes a controller 12 having an algorithm 100 adapted for executing the method of the present invention during a predetermined resolver fault condition, as will be described below with reference to FIGS. 2-6. The vehicle 10 includes a transmission 14 having at least one high-voltage electric motor/generator unit (MGU) 16 and at least one gear set (GS) 17.

The controller 12 may be configured as a digital computer generally including a CPU, and has sufficient memory for executing its required functions, such as read only memory (ROM), random access memory (RAM), electrically-programmable read only memory (EPROM), etc. The controller 12 may include a high-speed clock, analog-to-digital (A/D) and/or digital-to-analog (D/A) circuitry, and input/output (I/O) circuitry and devices, as well as appropriate signal conditioning and buffering circuitry. Any algorithms resident in the controller 12 or accessible thereby, including the algorithm 100 described below with reference to FIG. 6, or any other required control algorithms, may be stored in ROM and automatically executed by the controller 12 to provide the required control functionality.

The vehicle 10 includes a high-voltage energy storage system (ESS) 18, e.g., a lithium ion battery module or other suitable high-voltage device that has the ability to selectively store and dispense electrical power as needed, and an internal combustion engine (E) 20 having an output member 21 that serves as or is connected to an input member to the transmission 14. A final drive assembly (not shown) may be operatively connected to an output member 22 of the transmission 14 and drive wheels 24 for propulsion of the vehicle 10. Other power sources may be used to propel the vehicle 10 within the intended scope of the invention, such as a fuel cell (not shown). The vehicle 10 may be propelled at times exclusively using the ESS 18 and the MGU 16.

In the hybrid vehicle embodiment of FIG. 1, the ESS 18 is electrically-connected to the MGU 16 via a high-voltage DC bus 26 and a DC-to-AC pulse-width modulating (PWM) power inverter module or PIM 28. As will be understood by those of ordinary skill in the art, a PIM such as the PIM 28 is configured to receive motor control commands and control inverter states to provide motor drive or regeneration functionality. When operating as an electric motor, the MGU 16 may draw electrical energy from the ESS 18, and likewise may generate electrical energy to the ESS 18 for storage therewithin when operating as a generator. According to one embodiment, the MGU 16 may be configured as a three-phase alternating current (AC) high-voltage motor, such as a permanent magnet synchronous motor of the type known in the art.

Still referring to FIG. 1, the MGU 16 includes a rotor 19 having a determinable angular rotor position (arrow $P_R$). A resolver (R) 27 having a decoder chip 23 is electrically-connected to the rotor 19, and is adapted for continuously monitoring and/or measuring the rotor position ($P_R$), and for communicating this value, along with the speed of the rotor, to the controller 12 for use by algorithm 100. The controller 12 executes one or more motor control responses in response to a detected resolver fault condition using values of a set of control input signals, including but not necessarily limited to the measured rotor position ($P_R$).

The algorithm 100 is automatically executed during a predetermined resolver fault condition, which according to one embodiment may include each of: a short-duration fault (SD Fault), a medium-duration fault (MD Fault), a long-duration fault (LD Fault), and a repeated medium-duration fault (RMD Fault), as shown in FIGS. 2-5, respectively. The SD Fault occurs when the duration of the fault is shorter than an initial coast period, i.e., a period over which rotor speed remains substantially unchanged to the mechanical time constant, while the MD Fault occurs when the duration of the fault is longer than the initial coast period but shorter than a calibrated resolver retry period. Likewise, the LD Fault occurs when the duration of the fault is longer than the calibrated resolver retry period, while the RMD Fault occurs when the duration of the fault is greater than the initial coast period and less than a calibrated retry period.

Figure 2:
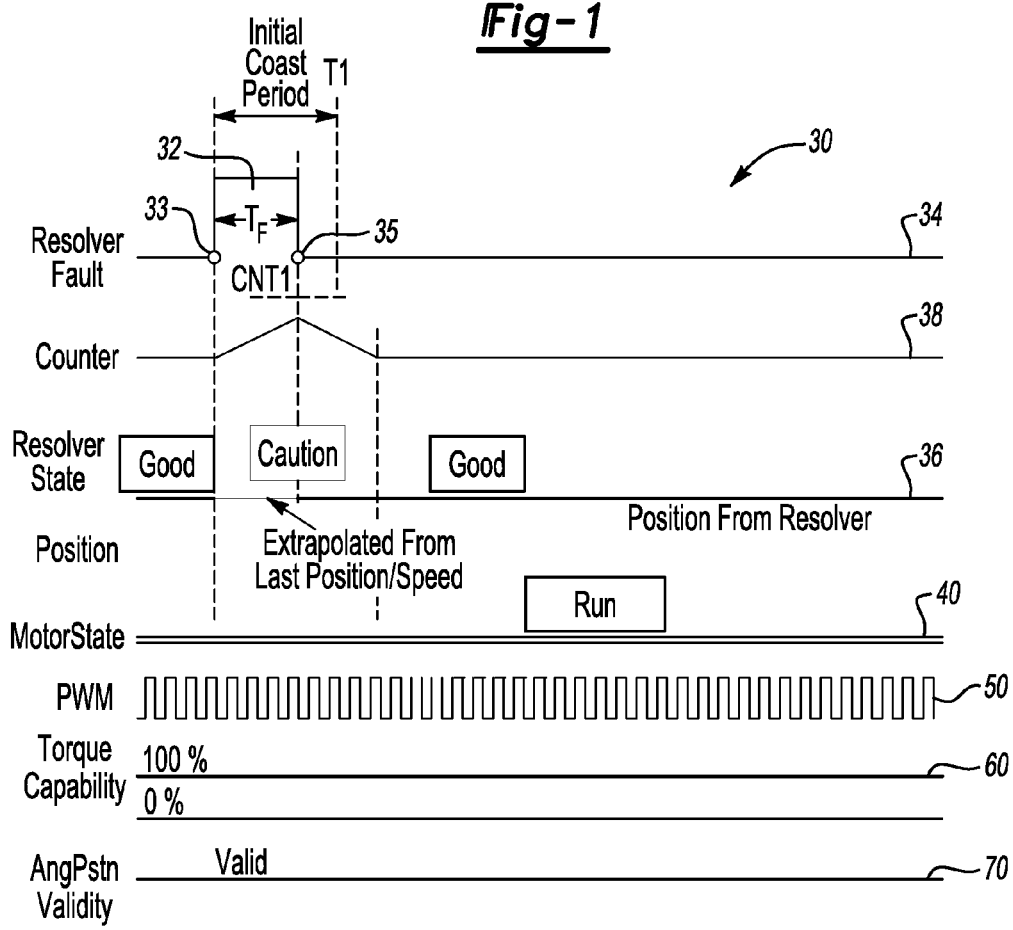
FIG. 2 is a graph describing a first resolver fault condition executable using the controller shown in FIG. 1.

Referring to FIG. 2, the first resolver fault condition, i.e., the SD Fault, may be depicted via a graph 30. Algorithm 100 of FIG. 6 as described below is executed when a duration ($T_F$) of a detected resolver fault 32 in a fault trace 34, i.e., the time measured between points 33 and 35, is shorter than a calibrated initial coast period (T1). For example, if the duration of resolver fault 32 is 5 ms and the calibrated initial coast period (T1) is 20 ms, a fault state trace 36 may switch from "good" to "caution" at point 33, and a fault counter trace 38 may begin to ramp up at point 33 at a calibrated rate. The resolver fault 32 terminates at point 35, and thereafter the fault state trace 36 may automatically switch from "caution" to "good". Fault counter trace 38 may then ramp down at the same or a different calibrated rate depending on the desired functionality.

By changing the calibrated rate of the fault counter the time to transition from a "caution" state to a "good" state may be modified as needed to optimize performance. If a resolver fault is detected after the calibrated initial coast period (T1), the controller 12 will follow the sequence shown in FIG. 3, i.e., the MD Fault. The graph 30 also shows a motor state trace 40, a pulse-width modulation (PWM) trace 50 describing the status of the PIM 28, a torque capacity trace 60 describing the output status of the MGU 16, and a rotor angle or position validity trace 70.

For the SD Fault condition of FIG. 2, the motor state trace 40 describes the uninterrupted operation of the MGU 16 at 100% of its torque capacity, as indicated by trace 60. The validity of any measurements using the resolver 27 is affirmed in trace 70, and PWM continues via the PIM 28 per normal calibrated PWM functionality. At point 33, the controller 12 extrapolates the rotor position using the last known position/speed. After point 35 the controller 12 again utilizes the rotor position values transmitted by the resolver 27.

Figure 3:
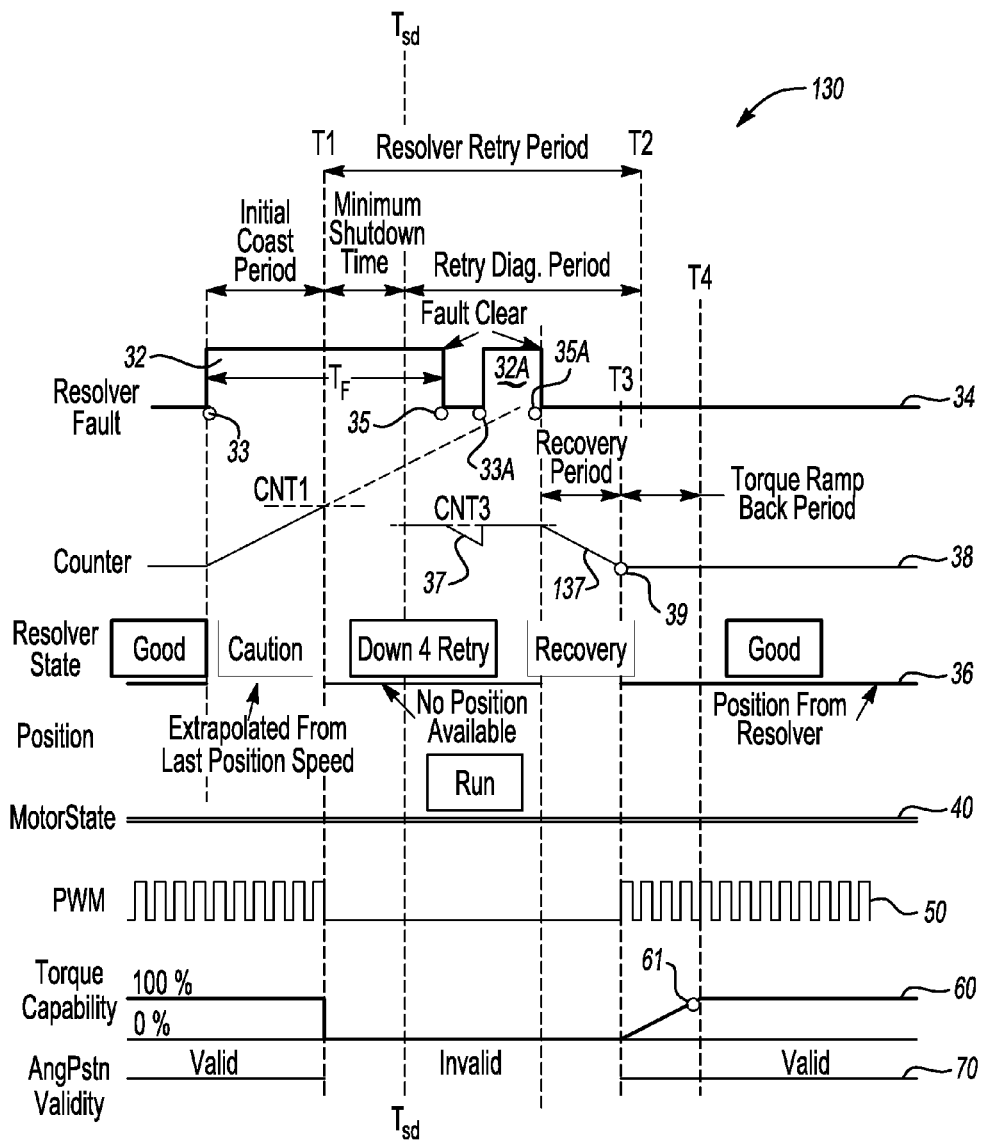
FIG. 3 is a graph describing a second resolver fault condition executable using the controller shown in FIG. 1.

Referring to FIG. 3, the medium-duration or MD Fault may be depicted via graph 130. Graph 130 depicts the "resolver retry" functionality of algorithm 100 when a duration ($T_F$) of a resolver fault 32 in trace 34, i.e., the time measured between points 33 and 35, is longer than a calibrated initial coast period (T1) but shorter than a resolver retry period (T2). Fault state trace 36 may automatically switch from a "good" state to a "caution" state at point 33, and then remain in the caution state through the initial coast period, i.e., until T1, and remaining in a variant of the cautionary state, "down 4 retry, until a time corresponding to point 35A of trace 34. Recovery begins at point 35A, continuing for a calibrated recovery period (T3). The torque ramp-up period commences at T3, and concludes at T4. Fault counter trace 38 may ramp up at a calibrated rate beginning at point 33, with the ramp terminating after the initial coast period (T1). At point 35, i.e., when the resolver fault 32 initially terminates, the fault state trace 36 may continue to indicate a cautionary state (labeled "Down 4 Retry" in FIG. 3). During a retry diagnostic period ($T_{sd}$ to T2) another resolver fault 32A may be automatically initiated with respective start and stop points 33A, 35A.

Ramp down of the fault counter trace 38 may begin at point 35A, again at a calibrated rate.

When the resolver fault 32 sustains longer than the initial coast period (T1) as shown in FIG. 3, the controller 12 of FIG. 1 may be presented with two choices: (1) if calibration is set to a first value, e.g., a value of 1, the controller 12 may change the fault state from "caution" to "retry", and the controller will then execute diagnostics that will shut down the PIM 28 and launch the retry process. If calibration is set to a second value, e.g., 0, the controller 12 will instead go to the LF Fault mode shown in FIG. 4. When calibration is set to the first value, the PIM 28 is shut down, and available motor torque (trace 60) is reduced to a threshold minimum value. After the PIM 28 has been shut down, the controller 12 waits through the minimum shutdown period (T1 to $T_{sd}$), and then checks the resolver fault during the retry period ($T_{sd}$ to T2).

For induction motors, the minimum shutdown period (T1 to $T_{sd}$) should be calibrated for the current of MGU 16, i.e., its stator current and its rotor current, to decay to a threshold minimal value. When the MGU 16 is configured an induction motor, the stator current will be zero as soon as the PIM 28 is turned off, but the rotor current ($i_{rotor}$) will decay as a function of the rotor time constant ($T_r$), per the function:

$$i_{rotor} = i_{rotor_{initial}} e^{-\frac{t}{T_r}}$$

Therefore, for an induction motor the minimum shutdown period may be approximately three to four times that of the rotor time constant ($T_r$).

In case of permanent magnet (PM) motors, the minimum shutdown period may be calibrated to avoid overshoot due to a three-phase short operation, which can be calibrated on when resolver signals are absent. Resolver fault recovery may be checked at all times during the interval of T1 to T2. PWM may be prevented or delayed until the resolver state is good. In either case, i.e., PM or induction-type motors, the value of Tsd may be calibrated.

During the retry diagnostics period (from $T_{sd}$ to T2), as soon as the resolver fault disappears at any point, e.g., at point 35, the controller 12 may count downward via the counter (CNT3) as shown by traces 37, 137. The counter will reach zero at point 39 when no fault is present over the duration of the recovery period. If the counter reaches zero before the resolver retry period expires, the controller may change the fault state from "recovery" to "good", e.g., at point 39. The PIM 18 may then be turned on, as indicated by trace 50. The initial torque capability at point 39 will be zero, and will recover linearly to 100% at point 61 during the torque ramp-back period. Rotor position is obtained from the resolver 27 after point 39.

Figure 4:
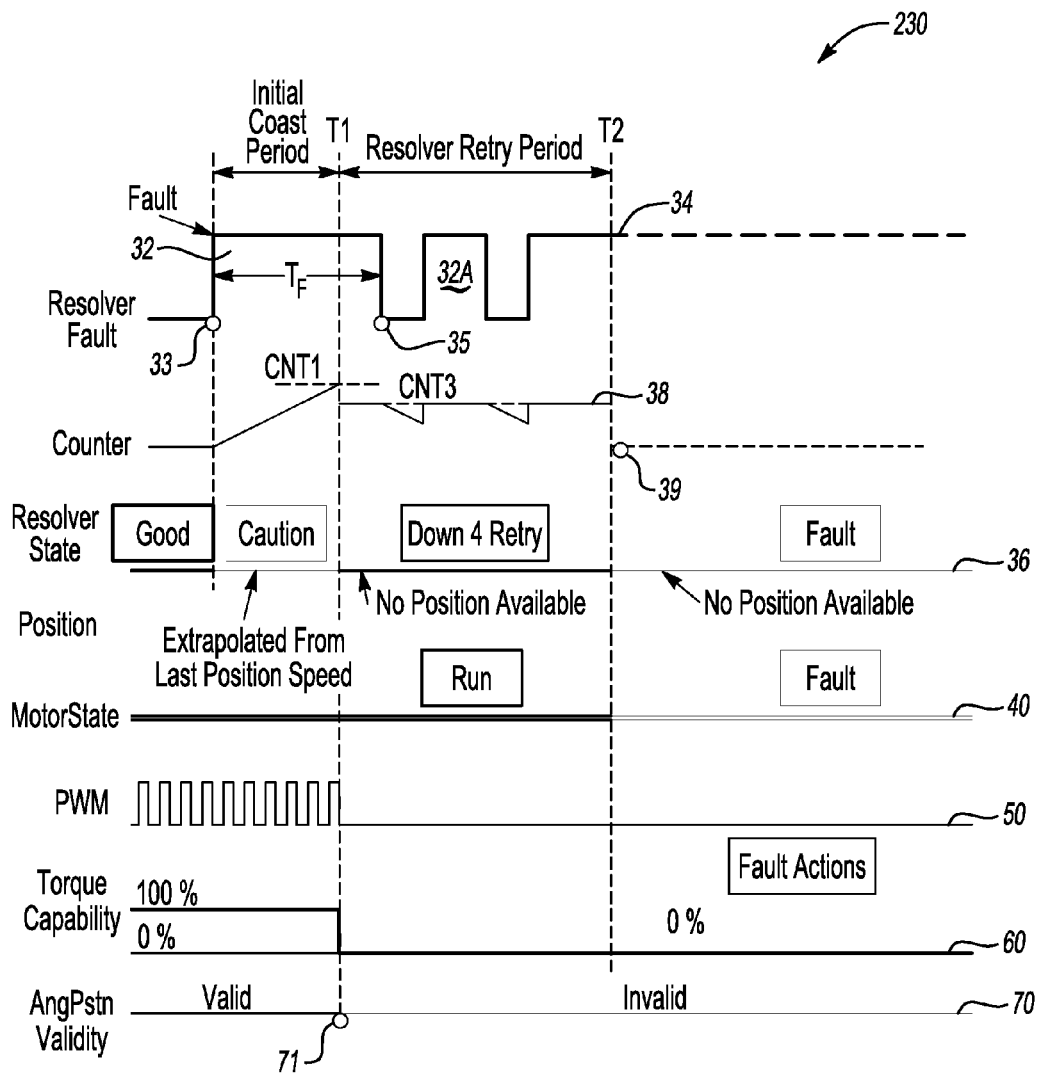
FIG. 4 is a graph describing a third resolver fault condition executable using the controller shown in FIG. 1.

Referring to FIG. 4, a long-duration of LD Fault is shown by graph 230, with the LD Fault occurring when the duration of the fault is longer than the calibrated resolver retry period. The LD fault occurs if the counter (CNT3) does not reach zero until the end of resolver retry period (T2), i.e., at point 39. The controller 12 may then change the resolver fault state (trace 36) to "fault" at point 39, and may change the motor state from RUN to Fault at point 39 as indicated by trace 40. The PIM 28 of FIG. 1 responds according to the predefined fault action. Note that at point 71 the validity trace 70 is switched to "invalid" and the torque capacity is reduced to 0% as shown by trace 60. PWM functionality ceases, as indicated by trace 50.

Figure 5:
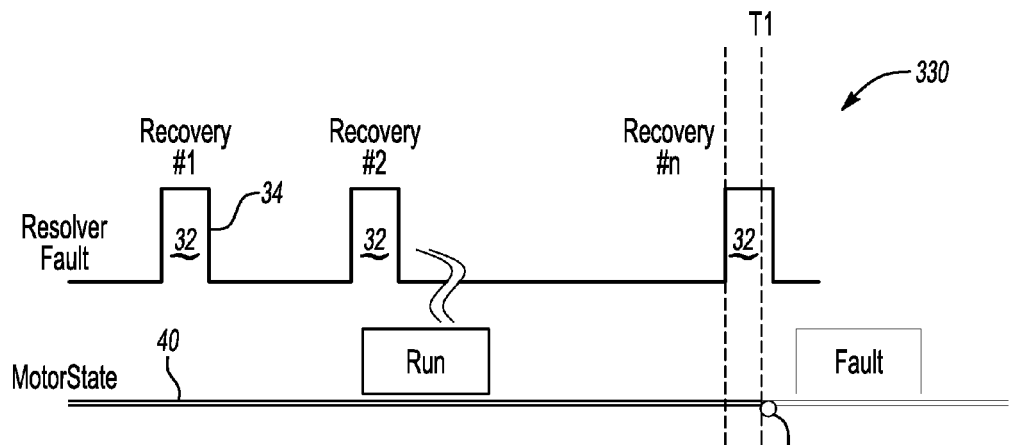
FIG. 5 is a graph describing a fourth resolver fault condition executable using the controller shown in FIG. 1.

Referring to FIG. 5, the resolver retry functionality is shown with repeated medium-duration faults, i.e., the RMD Fault condition, via a graph 330. Recovery may occur multiple times due to repeated medium-duration faults 32. However, a maximum number (n) of faults in the recovery may be limited to a calibrated value. If the MD Fault occurs (n) times, the controller 12 of FIG. 1 may change the fault state from "caution" to "fault" at point 41.

Figure 6:
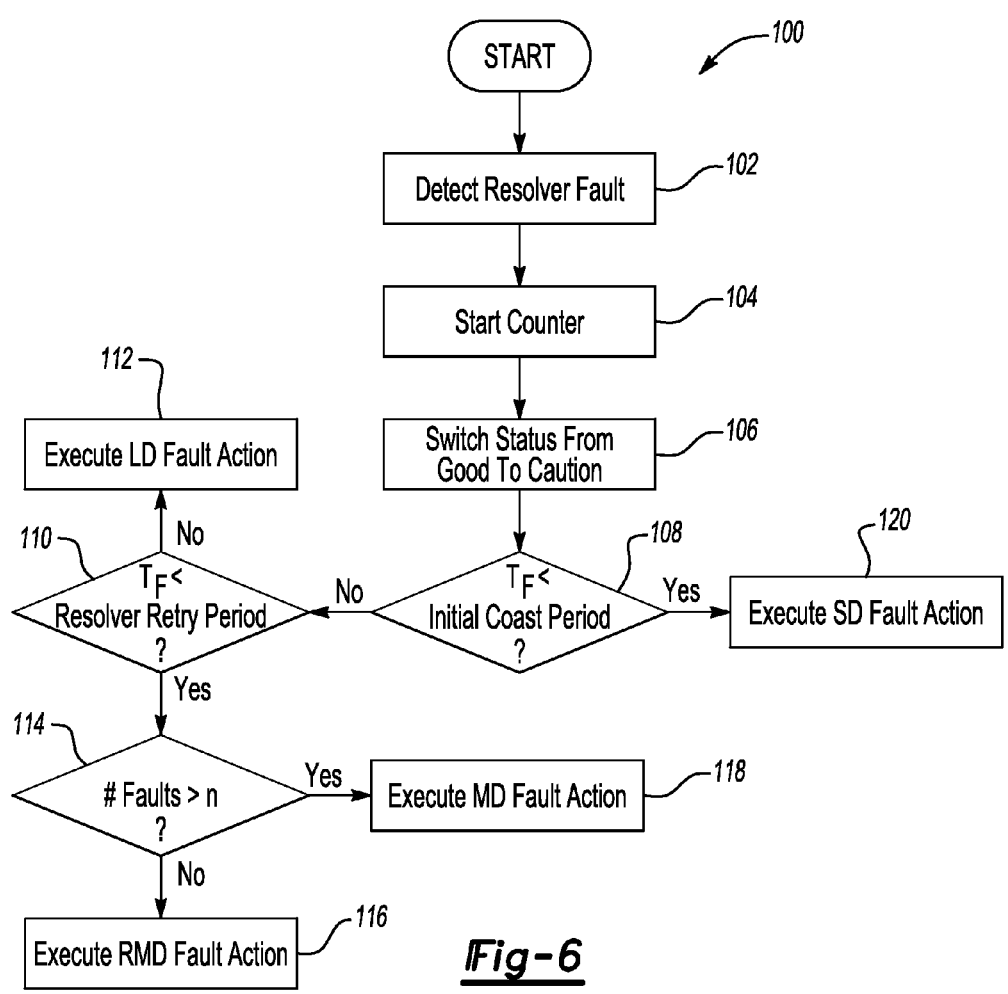
FIG. 6 is a flow chart describing an algorithm for executing the method of the present invention.

Referring to FIG. 6 in conjunction with the vehicle 10 of FIG. 1, the algorithm 100 is shown in flow chart form commencing with step 102. The controller 12 receives signals from the resolver 27 and detects or otherwise determines whether a resolver fault is present. The resolver 27 may include decoder chip 23 that transmits various signals to the controller 12, e.g., a loss of signal (LOS), a degradation of signal (DOS), or a loss of tracking (LOT). As will be understood by those of ordinary skill in the art, an LOS may be detected when a resolver input falls below the specified threshold by comparing the monitor signal to a fixed minimum value. A DOS may be detected when a resolver input exceeds the specified threshold. A LOT may be detected when an internal error signal exceeds a threshold level, or when the input signal exceeds a maximum tracking rate.

Upon detection of the resolver fault, the algorithm 100 proceeds to step 104 wherein a timer may be started and ramped at a calibrated rate. Once started, at step 106 the algorithm 100 switches the resolver fault state from "good" to "caution", and then proceeds to step 108.

At step 108, the algorithm 100 compares the resolver fault duration ($T_F$) to a first calibrated value, referred to hereinabove as the initial coast period as described above. The algorithm 100 proceeds to step 120 if the duration ($T_F$) is less than the first calibrated value/initial coast period, otherwise proceeding to step 110.

At step 110, the algorithm 100 compares the duration ($T_F$) to a second calibrated value, i.e., a maximum allowable resolver retry period. If the duration ($T_F$) is longer than the second calibrated value/resolver retry period, the algorithm 100 proceeds to step 112, otherwise it proceeds to step 114.

At step 112, the algorithm 100 executes the Long Duration (LD) Fault processes detailed above.

At step 114, the algorithm 100 determines whether the number of resolver faults is greater than a calibrated threshold (n), as explained above. If so, the algorithm 100 proceeds to step 118. Otherwise, the algorithm 100 proceeds to step 116.

At step 116, the algorithm 100 executes the Medium Duration (MD) Fault process detailed above.

At step 118, the algorithm executes the Repeated Medium Duration or RMD Fault process described above.

Using the algorithm 100 in conjunction with the vehicle 10 as set forth above, a robust strategy is provided for processing resolver faults without necessarily shutting down the vehicle. Execution of the algorithm 100 may enable a reduced chance of setting a resolver fault code, less frequent vehicle shut down events, and reduced warranty costs.

While the best modes for carrying out the invention have been described in detail, those familiar with the art to which this invention relates will recognize various alternative designs and embodiments for practicing the invention within the scope of the appended claims.

The invention claimed is:

1. A method of controlling a motor/generator unit (MGU) comprising:
   receiving a position signal from a resolver that is electrically connected to a rotor of the MGU, wherein the position signal describes a measured angular position of the rotor;

determining the presence of a resolver fault using the value of the received position signal;

calculating an estimated position of the rotor when the presence of the resolver fault is determined;

determining a duration of the resolver fault;

setting a predetermined resolver fault state determined using the duration of the resolver fault; and controlling the MGU using the estimated position of the rotor for at least a portion of the duration of the resolver fault state, including:

sustaining a level of torque output of the MGU when the duration of the resolver fault is less than a threshold duration; and reducing the level of torque output of the MGU when the duration of the resolver fault is greater than the threshold duration.

2. The method of claim 1, wherein determining a duration of the resolver fault includes initiating a timer upon determination of the presence of the resolver fault.

3. The method of claim 1, further comprising: recording a last known valid position of the rotor.

4. The method of claim 1, further comprising: using the MGU to propel a vehicle.

5. A method of controlling a motor/generator unit (MGU) comprising:

receiving a signal from a resolver that is electrically connected to a rotor of the MGU, the position signal describing at least a measured angular position of the rotor;

detecting a resolver fault using a decoder chip;

extrapolating a position of the rotor from a last known valid position of the rotor when the resolver fault is detected by the decoder chip;

selecting one of a plurality of different resolver fault states based on a duration of the resolver fault; and controlling a torque output of the MGU via a controller using the extrapolated position of the rotor for at least a portion of the duration of the selected resolver fault state.

6. The method of claim 5, wherein detecting the resolver fault includes detecting one of: a loss of signal (LOS), a degradation of signal (DOS), and a loss of tracking (LOT).

7. The method of claim 5, wherein selecting one of a plurality of different resolver fault states includes: selecting one of: a short duration (SD) fault, a medium duration (MD) fault, a long duration (LD) fault, and a repeated medium duration (RMD) fault.

8. The method of claim 5, wherein controlling a torque output of the MGU includes varying a pulse-width modulation (PWM) operation.

9. The method of claim 5, wherein controlling the torque output of the MGU includes at least temporarily reducing the torque output when the duration of the resolver fault is greater than a first threshold duration and less than a second threshold duration.

10. The method of claim 9, wherein controlling the torque output of the MGU includes: reducing the torque output level to zero when the duration of the resolver fault is greater than the second threshold duration.

11. A motor control circuit comprising:

a motor/generator unit (MGU) having a rotor;

a resolver that is electrically connected to the rotor and adapted for monitoring an angular position thereof; and a controller in communication with the resolver and with the MGU, wherein the controller is configured to:

receive a position signal from the resolver;

detect a resolver fault using the received position signal from the resolver;

extrapolate an estimated position of the rotor when the resolver fault is detected;

select a resolver fault state based on a duration of the resolver fault; and control the torque output of the MGU using the extrapolated rotor position for at least a portion of the duration of the selected resolver fault state.

12. The circuit of claim 11, wherein the controller is configured to control the output of the MGU by automatically varying a pulse-width modulation (PWM) operation based on the duration of the resolver fault.

13. The circuit of claim 11, wherein the controller is configured to control the torque output of the MGU by at least temporarily reducing the torque output when the duration of the resolver fault is greater than a first threshold duration and less than a second threshold duration.

14. The circuit of claim 13, wherein the controller is configured to control the torque output of the MGU by reducing the torque output to zero when the duration of the resolver fault is greater than the second threshold duration.

15. The circuit of claim 13, wherein the resolver includes a decoder chip, and wherein the controller is in communication with the decoder chip and receives one of a plurality of different fault signals therefrom.

16. The circuit of claim 13, wherein the controller is used aboard a vehicle, and wherein the MGU is adapted operable for propelling the vehicle.

* * * * *